United States Patent [19]

Yoshida

[11] Patent Number: 5,059,474
[45] Date of Patent: Oct. 22, 1991

[54] FLOOR COVERING TILE

[75] Inventor: Yuji Yoshida, Fukushima, Japan

[73] Assignee: Nitto Boseki Co., Ltd., Fukushima, Japan

[21] Appl. No.: 378,947

[22] Filed: Jul. 12, 1989

[30] Foreign Application Priority Data

Jul. 12, 1988 [JP] Japan .................. 63-171920

[51] Int. Cl.$^5$ .............................. B32B 1/00
[52] U.S. Cl. ...................... 428/174; 428/81;
428/175; 428/177; 428/192; 428/193; 428/212;
428/213; 428/215; 428/228; 428/240; 428/283;
428/284; 428/285; 428/286; 428/337; 428/339;
428/282
[58] Field of Search ............ 428/49, 124, 81, 82,
428/85, 87, 88, 95, 130, 174, 175, 177, 192, 282,
284, 285, 286, 298, 193, 228, 240, 283, 212, 213,
215, 337, 339, 365; 52/80, 82, 223 R, 236.2, 245,
387, 390

[56] References Cited

U.S. PATENT DOCUMENTS

| | | | |
|---|---|---|---|
| 2,066,639 | 1/1937 | Masland | 428/82 |
| 4,010,301 | 3/1977 | Anderson et al. | 428/82 |
| 4,010,302 | 3/1977 | Anderson et al. | |
| 4,568,586 | 2/1986 | Gobrecht | 428/49 |
| 4,874,654 | 10/1989 | Funaki et al. | 428/49 |

FOREIGN PATENT DOCUMENTS 63-30534 2/1988 Japan .

Primary Examiner—Ellis P. Robinson
Assistant Examiner—Donald J. Loney
Attorney, Agent, or Firm—Sughrue, Mion, Zinn, Macpeak & Seas

[57] ABSTRACT

A floor covering tile is a lamination of several layers. A surface layer is a vinyl chloride resin with a small filler compounding ratio; an intermediate layer is a thermoplastic resin having a large filler compounding ratio, a lower layer is a thermoplastic resin having a large filler compounding ratio; and a glass fiber layer is in between the intermediate and lower layers. The lamination is gently curved to have a curved bottom surface.

6 Claims, 1 Drawing Sheet

FLOOR COVERING TILE

BACKGROUND OF THE INVENTION

The present invention relates to a floor covering tile to be laid on a floor ground surface of a building or the like so as to form a finished floor surface, and particularly aims to obtain a floor covering tile having a structure of a lamination of a surface layer of soft vinyl chloride resin and a basic layer of thermoplastic resin and having a gently concave lower surface so as to have a stable flat-surface laying property.

It is known to form a water-proof decoratively finished floor surface by adhesively attaching linoleum sheets, asphalt sheets, synthetic resin sheets, or tiles to an indoor or outdoor floor ground surface. This technique has a disadvantage in that it takes a relatively long time for the application and hardening of the adhesive, and it is troublesome to renew sheets. A floor covering tile, which is laid on a floor without using an adhesive, has been proposed (for example, Japanese Utility Model Unexamined Publication No. 63-30534) for the purpose of avoiding this disadvantage.

The conventional floor tile is flat and plate-like so as to form a smooth finished surface on a floor ground surface. In the case where the floor tiles are only laid on the floor, however, the floor tiles are often displaced by a local load due to a walker, movement of fixtures, setting up of a weight matter, or the like, so that edge portions of the tiles are easily curved upward. This tendency increases particularly in the case of floor tiles having soft elasticity, such as those used to improve the feel of walking thereon or to provide sound-proofing. Accordingly, it is necessary to form a complicated anti-displacement mechanism, and it is necessary to suitably adjust butting pressure in laying the floor tiles, so that the work becomes troublesome and the working cost increases.

SUMMARY OF THE INVENTION

The present invention solves the above-mentioned problems of conventional flat plate-like floor tiles by providing a floor tile having a specific lamination structure, which is suitably bent to thereby have a covering state causing floor-surface adhesion and a property that prevents edge portions from curving up.

The present invention is a floor covering panel characterized in that the panel is constituted by a surface layer made of soft vinyl chloride resin having a small filler compounding ratio, an intermediate layer made of thermoplastic resin having a large filler compounding ratio a glass fiber layer and a lower layer made of thermoplastic resin having a filler compounding ratio not smaller than that of the intermediate layer in which the surface layer, the intermediate layer, the glass fiber layer, and the lower layer are laminated in order the sum of the respective thicknesses of the surface layer and the intermediate layer is not larger than the thickness of the lower layer and the lamination sheet is bent so as to have a gentle concave lower surface so that when the lamination sheet is laid on a floor surface the lower surface is elastically transformed by the weight of the lamination sheet per se so as to be in close contact with the floor surface.

BRIEF DESCRIPTION OF THE DRAWINGS

The drawings show an embodiment of the floor covering tile according to the present invention, in which.

DETAILED DESCRIPTION OF THE INVENTION

Figure 1:
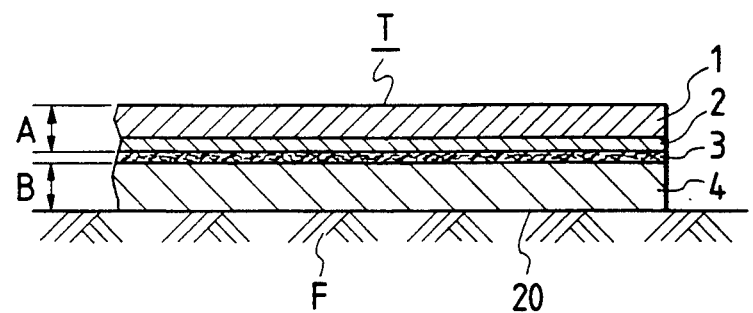
FIG. 1 is an enlarged section view showing a main portion of the floor covering panel in the laid state.

In the invention herein, the surface layer of the floor tile is generally formed in the form of a sheet of 1-3 mm by suitably mixing and kneading the following components with a filler compounding ratio substantially similar to the conventional one: That is, relative to 100 weight portions (hereinafter simply referred to as "portion") of vinyl chloride, 10-30 portions of a filler such as calcium carbonate, talc, stone powder, or the like 20-60 portions of a plasticizer such as DOP, DBP, or the like, 1-10 portions of a stabilizer, a desired coloring agent, and so on.

For the intermediate layer and the lower layer, a natural or synthetic thermoplastic resin is used, which has been used for the conventional floor material, such as synthetic rubber natural rubber, asphalt, vinyl chloride resin, other hot-melt resin, a mixture of any of them, or the like. For example, in the case of using vinyl chloride resin, it is suitable to use a mixture composition in which a plasticizer of 70-110 portions, a filler of 250-300 portions and a desired additive are compounded with the vinyl chloride resin of 100 portions. Generally, the thickness of the intermediate layer is selected to be 1-3 mm, and the thickness of the lower layer is selected to be the same or larger than the sum of the respective thickness of the surface layer and the intermediate layer.

For the glass fiber layer interposed between the intermediate layer and the lower layer a thin-layer sheet is used. Examples of a suitable thin-layer sheet of glass fiber are a rough cloth, cloths, nonwoven cloths, a chopped strand mat, or the like, having dimensional stability and suitable hardness and generally having a thickness not thicker than 1 mm.

The lamination sheet described above is bent so as to make the lower surface of the lower layer concave gently, thereby obtaining the floor covering tile according to the present invention.

The degree of bending of the floor tile described above is such that when the floor tile is laid over a horizontal floor surface, the floor tile is elastically transformed by its own weight so as to become flat. The lower surface of the floor tile thus comes in close contact with the horizontal floor surface. The bending may be such that the lower surface becomes a concave surface substantially arcuately curved in one direction, or more desirably, a spherical concave surface substantially arcuately curved in two orthogonal directions.

The apparatus for bending the lamination sheet may comprise an individual molding means such as a press work employing a curved or spherical surface die. A desirable method of forming an elongated lamination having surface-contractible internal strain which increases from the top layer surface toward the lower layer surface comprises a continuous working process in which, after the foregoing lamination sheet is formed by a continuous manufacturing method, the lamination sheet is passed through a nip of a two-roll calendar under suitable pressure and then cut into squares of a predetermined size. Through this process, it is possible to efficiently manufacture curved products each having a lower surface which is gently concave and spherical under free conditions.

In the case where the floor covering tile is required to have an antistatic property a thin layer which is made of vinyl chloride or rubber mixed with carbon black, carbon fibers, metal fibers, or the like and which has a volume specific resistance of $1 \times 10^{5\text{-}8}$ Ω cm is interposed between the surface layer and the intermediate layer, or sufficiently, in addition to the above-mentioned interposed layer, an electrically conductive plasticizer (for example, SANSOCIZER C1100 made by NEW JAPAN CHEMICAL CO. LTD.) is used as the plasticizer in the composition of the surface layer or an electrically conductive surface-active agent of 1–3 weight % (for example. TB-160 made in MATSUMOTO YUSHI CO. LTD.) is added to the plasticizer in the composition of the surface layer to thereby give electrical conductivity to the surface layer so that the volume specific resistance of the surface layer becomes about $1 \times 10^{7\text{-}9}$ Ω cm.

In the floor covering tile according to the present invention, the glass fiber layer having dimensional stability and a reinforcing property is interposed in the tile lamination at a level not lower than the central portion of the whole thickness of the tile, the upper layer is constituted by the surface layer of soft vinyl chloride resin the intermediate layer is constituted of slightly hard thermoplastic resin, and the lower layer is made of only the slightly hard thermoplastic resin. Accordingly, the surface layer which is superior in shock-absorbing property, is reinforced with the glass fiber layer located closely adjacent to the lower surface of the surface layer and the glass fiber layer is located at an upper portion within a structure of thermoplastic resin including the slightly hard intermediate and lower layers, whereby the modulus of elasticity of the curved lamination sheet having a gently concave lower surface can be improved, as a whole so that the tile can be firmly pressed by its own weight against a horizontal floor surface to thereby obtain a stable covering condition and thereby prevent the peripheral edges of the tile from being curved up by external force exerted onto the upper surface of the tile.

The above action is caused by the fact the glass fiber layer is interposed at a position not lower than the central portion in the whole height of the lamination sheet. In the case where the intermediate layer is not provided and the glass fiber layer is attached directly to the lower surface of the surface layer, however, the result is undesirable because not only the adhesion stability and curve preventing property of the floor tile is deteriorated, but the layers are apt to separate from each other.

In the case of the curved tile, more preferably, the adhesion stability and the curve preventing property are superior to those in the case where the one-directional gentle concave lower surface is formed, and at the same time the floor-surface suction action can be obtained so that the operation for stably maintaining the smooth covering condition can be increased.

Referring to the drawings and on the basis of the method of manufacturing the floor covering tile, an embodiment of the present invention will be described.

FIG. 1 is an enlarged sectional view showing a main portion of the state of lamination of the floor covering tile T according to the present invention. In the drawing, the reference numeral 1 designates a surface layer made of soft vinyl chloride resin having a small filler compounding ratio 2 designates an intermediate layer made of thermoplastic resin having a large filler compounding ratio 3 designates a glass fiber layer, 4 designates a lower layer made of thermoplastic resin having a filler compounding ratio hot smaller than that of the intermediate layer 2, and 20 designates a gently concave lower surface which is in a curved state in free conditions of the floor tile T but comes in close contact with a horizontal floor surface F so as to be made flat when the floor tile T is laid on the floor surface F.

An example of the specific method of manufacturing the floor covering tile T will be described hereunder.

The following steps were successively performed on a horizontally moving surface of an endless belt of fluororesin to thereby form a lamination sheet.

A layer of a plastisol of the following compounding components was formed by doctor coating to a thickness of about 3 mm.
polyvinyl chloride resin ($\bar{p}$, 800) 100 portions
plasticizer (DOP) 100 portions
filler (calcium carbonate) 250 portions
Successively, glass fiber unwoven cloth of about 0.5 mm thick and 40 g/m² was laminated on the surface of the above-mentioned layer of plastisol, a layer of plastisol of polyvinyl chloride resin was formed to a thickness of about 1 mm by doctor coating on the layer of glass fiber unwoven cloth then a 2 mm-thick sheet of soft polyvinyl chloride resin having the following composition was put on the above-mentioned layer of plastisol of polyvinyl chloride resin and finally the resulting lamination was pressed lightly.
polyvinyl chloride resin ($\bar{p}$, 800) 100 portions
plasticizer (DOP) 40 portions
filler (calcium carbonate) 20 portions
stabilizer 5 portions
coloring pigment little The belt carrying the thus prepared sheet-like lamination mounted thereon was passed through a heat treating apparatus at 120° C. so that the coating sol was hardened into gel, the lamination was taken out and passed through a low-pressure calendar constituted by a lower roller having a fine uneven embossed surface and an upper smooth roller under the temperature-rising conditions so that the lamination sheet was made to have a densely laminated state, and then the lamination sheet was punched to thereby obtain covering tile products shaped into a square of 50 cm on each side.

Each of the products had a weight of 2 kg (8 kg/m²) and had a shape of a curved lamination in which the embossed surface was gently spherically curved to result in a concave lower surface 20.

Figure 2A:
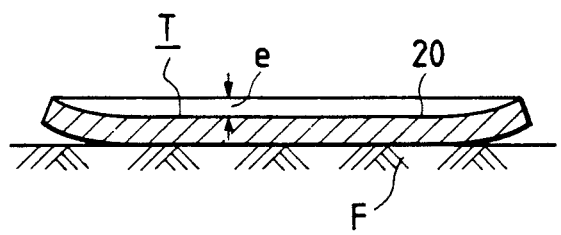
FIG. 2 is an explanatory view showing the state where the covering tile is laid on a horizontal floor surface.
Figure 2B:
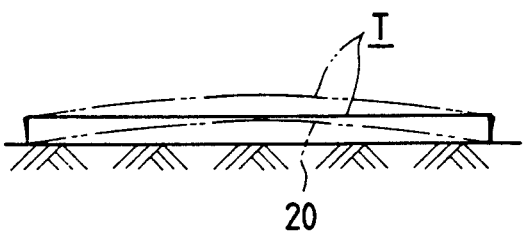

When the products were laid on a horizontal floor surface F with the gentle concave lower surface 20 facing upward, the peripheral edges of the lower surface 20 has a curving-up height e of about 40 mm relative to the central surface as shown in FIG. 2(a). while in the normal covering state in which the above state is inverted as shown in FIG. 2(b), the tile lay flat along the horizontal floor surface so as to be in a stable adhesion state. The phantom lines in FIG. 2(b) illustrate the gentle concave surface 20 before the weight of the tile causes it to flatten.

The products were cut along one side into pieces of width of 1 cm and the cut surface was laid on a horizontal floor surface and the curve thereof was measured.

The measured curve was a substantially arcuate shape having a radius of curvature of about 3.5 m. A cut piece similarly obtained by cutting the products along another side perpendicular to the above-mentioned one side had an arcuate curve having a radius of curvature of about 4.5 m.

The finished floor surface formed by laying the floor covering tiles adjacently to each other on a floor ground surface maintains durable surface-smoothness and is superior in durability, shock-absorbing property, soundproof property, dust-proof property, and sanitary property, so that the floor covering tile is suitable for finishing a floor surface, particularly, in a hospital, a dining room, a non-dust room, etc., and, furthermore, it is extremely simple and easy to exchange and repair floor tiles partially on a floor surface to thereby make it possible to maintain the floor surface in a good state all the time.

The floor covering tile according to the present invention has a structure that provides a stable and smooth finished floor surface which can be easily formed in comparison with the conventional flat covering tile and which has good shock-absorbing and soundproofing properties.

What is claimed is:

1. A floor covering panel comprising a lamination of a surface layer made of soft vinyl chloride resin having a small filler compounding ratio, an intermediate layer made of thermoplastic resin having a large filler compounding ratio, a glass fiber layer, and a lower layer made of thermoplastic resin having a filler compounding ratio no smaller than that of said intermediate layer; the sum of the respective thicknesses of said surface layer and said intermediate layer being not larger than the thickness of said lower layer, and said panel having first and second side edges, said first and second side edges having a gentle concave lower surface along their entire lengths; said concavity being such that said panel will lie flat on a horizontal surface due to the elasticity and weight of said panel when placed lower surface face down.

2. A floor covering panel as claimed in claim 1, wherein said surface layer is constituted by about 100 parts by weight of a vinyl chloride, 10-30 parts by weight of a filler, 20-60 parts by weight of a plasticizer, 1-10 parts by weight of a suitable stabilizer, and an effective amount of a coloring agent.

3. A floor covering panel as claimed in claim 2, wherein said intermediate and lower layers comprise 70-110 parts by weight of plasticizer, 250-300 parts by weight of filler, and about 100 parts by weight of vinyl chloride resin.

4. A floor covering panel as claimed in claim 3, wherein said surface layer is 1-3 mm thick, said intermediate layer is 1-3 thick, said glass fiber layer is less than 1 thick, and said lower layer is at least as thick as the combination of said surface layer and said intermediate layer.

5. A floor covering panel as defined in claim 1, wherein said concavity is substantially arcuately curved in one direction.

6. A floor covering panel as defined in claim 1, wherein said concavity is substantially arcuately curved in two orthogonal directions.

* * * * *